(12) United States Patent
Ducrot et al.

(10) Patent No.: US 11,210,386 B2
(45) Date of Patent: Dec. 28, 2021

(54) TECHNIQUE FOR MANAGING A RIGHT OF ACCESS TO A SERVICE FOR A COMMUNICATING DEVICE

(71) Applicant: ORANGE, Issy-les-Moulineaux (FR)

(72) Inventors: Nicolas Ducrot, Chatillon (FR); Julien Sicart, Chatillon (FR); Said Gharout, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 198 days.

(21) Appl. No.: 16/467,364

(22) PCT Filed: Nov. 27, 2017

(86) PCT No.: PCT/FR2017/053261
§ 371 (c)(1),
(2) Date: Jun. 6, 2019

(87) PCT Pub. No.: WO2018/104610
PCT Pub. Date: Jun. 14, 2018

(65) Prior Publication Data
US 2019/0332761 A1   Oct. 31, 2019

(30) Foreign Application Priority Data

Dec. 8, 2016   (FR) ...................... 1662161

(51) Int. Cl.
*G06F 21/44* (2013.01)
*G06F 21/81* (2013.01)
(Continued)

(52) U.S. Cl.
CPC ............ *G06F 21/44* (2013.01); *G06F 21/81* (2013.01); *H04W 12/06* (2013.01); *H04W 12/35* (2021.01)

(58) Field of Classification Search
CPC ........ G06F 21/44; G06F 21/81; H04W 12/06; H04W 12/35
See application file for complete search history.

(56) References Cited

U.S. PATENT DOCUMENTS 6,126,070 A * 10/2000 Fukuzumi ............... G11C 7/24
                                                      235/380
6,298,447 B1 * 10/2001 Wang ...................... G06F 21/31
                                                      713/300
(Continued)

FOREIGN PATENT DOCUMENTS

| EP | 1780897 A1 | 5/2007 |
|---|---|---|
| EP | 2461613 A1 | 6/2012 |
| WO | 2007001129 A1 | 1/2007 |

OTHER PUBLICATIONS

S. Bouzefrane and L. V. Thinh, "Trusted Platforms to Secure Mobile Cloud Computing," 2014 IEEE Intl Conf on High Performance Computing and Communications, 2014 IEEE 6th Intl Symp on Cyberspace Safety and Security, 2014 IEEE 11th Intl Conf on Embedded Software and System 2014, pp. 1068-1075. (Year: 2014).*

(Continued)

*Primary Examiner* — Kari L Schmidt
(74) *Attorney, Agent, or Firm* — David D. Brush; Westman, Champlin & Koehler, P.A.

(57) ABSTRACT

A technique for managing a right of access to a service for a communicating device. A security element of the device authenticates a security element of an electrical power supply module subsequent to a detection of a start of distribution of electrical energy to the device so as to power it electrically. These security elements are then associated. The security element of the power supply module then configures the security element of the device, the latter having, once configured, a right of access to a valid service (Continued)

allowing it to access the service and this right of access remaining valid as long as the device is powered by this electrical power supply module.

13 Claims, 2 Drawing Sheets

(51) Int. Cl.
*H04W 12/06* (2021.01)
*H04W 12/30* (2021.01)

(56) References Cited

U.S. PATENT DOCUMENTS

| | | | | |
|---|---|---|---|---|
| 7,917,741 | B2* | 3/2011 | Dutton | G06F 21/575 713/1 |
| 9,836,740 | B1* | 12/2017 | Geist | G06Q 20/3278 |
| 10,664,620 | B2* | 5/2020 | Berthet | G06F 21/70 |
| 2003/0074572 | A1* | 4/2003 | Hayashi | H04L 9/0897 713/193 |
| 2006/0204004 | A1* | 9/2006 | Shankar | G06F 21/71 380/44 |
| 2007/0072474 | A1* | 3/2007 | Beasley | H02J 7/02 439/332 |
| 2009/0267636 | A1* | 10/2009 | Choi | G11C 17/18 326/8 |
| 2009/0327678 | A1* | 12/2009 | Dutton | G06F 21/575 713/2 |
| 2012/0244805 | A1 | 9/2012 | Haikonen et al. | |
| 2012/0300932 | A1* | 11/2012 | Cambridge | G06Q 40/00 380/270 |
| 2014/0285318 | A1* | 9/2014 | Audeon | B60L 53/305 340/5.61 |
| 2015/0163056 | A1* | 6/2015 | Nix | H04L 9/0869 380/46 |
| 2015/0172054 | A1* | 6/2015 | Prakash | H04L 9/3263 713/189 |
| 2016/0063260 | A1* | 3/2016 | Sharp | H04L 63/105 726/1 |
| 2016/0224048 | A1* | 8/2016 | Rooyakkers | H02J 7/0047 |
| 2016/0292422 | A1* | 10/2016 | Hayashi | G06F 21/57 |
| 2017/0124330 | A1* | 5/2017 | Van Nieuwenhuyze | G06F 21/575 |
| 2017/0124331 | A1* | 5/2017 | Van Nieuwenhuyze | G06F 1/26 |
| 2019/0147434 | A1* | 5/2019 | Leung | G06F 1/1698 705/41 |
| 2019/0266360 | A1* | 8/2019 | Yin | G06F 21/60 |
| 2020/0052905 | A1* | 2/2020 | Mathias | H04L 9/3263 |
| 2021/0036870 | A1* | 2/2021 | Da Conceicao | H04L 9/3247 |

OTHER PUBLICATIONS

R. Helinski, D. Acharyya and J. Plusquellic, "A physical unclonable function defined using power distribution system equivalent resistance variations," 2009 46th ACM/IEEE Design Automation Conference, 2009, pp. 676-681. (Year: 2009).*
English translation of the Written Opinion of the International Searching Authority dated Jan. 29, 2018 for corresponding International Application No. PCT/FR2017/053261, filed Nov. 27, 2017.
GSMA "SGP.22—RSP Technical Specification" v.1.1 dated Jun. 9, 2016 (available from GSMA's website on the address http://www.gsma.com/newsroom/all-documents/sgp-22-technical-specification-v1-1/).
International Search Report dated Jan. 29, 2018 for corresponding International Application No. PCT/FR2017/053261, filed Nov. 27, 2017.
Written Opinion of the International Searching Authority dated Jan. 29, 2018 for corresponding International Application No. PCT/FR2017/053261, filed Nov. 27, 2017.

* cited by examiner

TECHNIQUE FOR MANAGING A RIGHT OF ACCESS TO A SERVICE FOR A COMMUNICATING DEVICE

CROSS-REFERENCE TO RELATED APPLICATIONS

This Application is a Section 371 National Stage Application of International Application No. PCT/FR2017/053261, filed Nov. 27, 2017, the content of which is incorporated herein by reference in its entirety, and published as WO 2018/104610 on Jun. 14, 2018, not in English.

FIELD OF THE DISCLOSURE

The invention pertains to the general field of telecommunications.

The invention relates more particularly to a technique for managing a right of access to a service for a communicating device.

The technique for managing a right of access to a service lies within the field of communicating devices having a cell-based or battery-based electric power supply.

BACKGROUND OF THE DISCLOSURE

Communicating or connected device is understood to mean a device able to exchange information with other devices. Among these devices, a distinction is drawn for those that exchange information by way of a communication network administered by a network operator, with, where applicable, another device, a communication terminal or else computer equipment of the communication network. The communication network may hinge on cellular mobile network technologies, known as 2G, 3G, 4G, 5G, and on low-consumption and long-range LPWA (for "low power wide area") network technologies, such as the LoRa network.

From the point of view of the user, communicating by way of what are known as long-range networks is distinguished from communicating by way of what are known as short-range networks (such as Bluetooth, Bluetooth Low Energy, Wi-Fi, Zigbee, Z-Wave, etc.) through the following advantages:
  independence from intermediary equipment for accessing a wide area communication network;
  security: the majority of long-range technologies intrinsically incorporate security features, such as authentication and encryption, which offer a native security guarantee for applications implemented on this network;
  ease of configuration and of use: there is no need to configure a security key or to perform pairing, which operations may prove to be extremely complex for the user when the device does not incorporate a screen or has limited input/output peripherals, or else for users not used to using this type of technology.

To connect a communicating device to a long-range communication network, it is generally necessary to use a subscription to the communication network specific to the communicating device. The communicating device may then connect autonomously and transparently for its user to access points of the communication network that are compatible with the communication means of the communicating device.

However, it is often not easy for the user of the communicating device to manage the subscription and then to configure the communication means of the communicating device so as to be able to access the network of the operator.

SUMMARY

One of the aims of the invention is to rectify inadequacies/drawbacks of the prior art and/or to make improvements thereto.

According to a first aspect, the invention relates to a method for managing a right of access to a service for a communicating device. The method comprises:
  authentication of a security element of an electric power supply module by a security element of the device, at the end of which authentication said security elements are associated, said authentication being triggered by a detection of a start of delivery of electric power to said device in order to supply electric power to said device;
  configuration of the security element of the device by the security element of the power supply module, the security element of the device, once configured, having a valid right of access to a service, allowing the device to access the service, and said access right remaining valid for as long as said device is supplied with power by said electric power supply module.

The technique for managing a right of access to a service takes its origin from a problem observed for a right of access to a communication network. However, it is applicable to any service, such as access to a communication network, access to an item of data, access to an application, access to a functionality or else a combination of these various different types of access.

Electric power supply module is understood to mean a cell or a battery intended to be inserted into a communicating device in order to supply power thereto.

By virtue of this technique, the right of access to a service depends on the supply of power to the communicating device by the power supply module. Said power supply module comprises not only an energy capacity to be supplied to the communicating device, but also a right to access a service, for example the communication network. The electric power supply module thus guarantees the communicating device a right of access to the service for as long as it is able to supply electric power to the device. The power supply module thus incorporates a right of access to the service. When the right of access to a service is a network access right, the electric power supply module thus guarantees the communicating device a right to communicate by way of a network for as long as it is able to supply electric power to the device. The power supply module thus incorporates a right to communicate using a communication network.

The right of access to a service is no longer available when the electric power supply module is discharged or else removed.

The user process is thus simplified: to access a communication network, the user does not have to manage a subscription and then configure his communicating device on the basis of his subscription. The same applies for access to a service. It is enough for the user to acquire an electric power supply module able to implement the actions (or the steps) of the method for managing a right of access to a service, and to insert it into his communicating device in order to access the service. The right of access to a service is renewed as soon as the user inserts a new electric power supply module. The user does not have to take care to keep his subscription to the network operator or else his subscription to the service.

This technique for managing a right of access to a service is particularly well suited to implementation in communicating devices, as these are very often supplied with power by electric power supply modules, such as cells or batteries, so as to be able to be moved easily.

This technique is particularly beneficial for telecommunications operators or long-range communication network access providers, since it makes it possible to implement a model for distributing the right of access to a service using a pre-existing distribution network, that is to say that of the cells or batteries. In addition, the user process is known and harnessed from beginning to end by a vast majority of consumers and end users: it is enough to purchase and then insert or change a cell inside a device. When the right of access to a service is a right of access to a communication network, also called network access right, such a technique is able to facilitate and encourage the development of new communicating devices within the industry of the Internet of Things, given the problems and restrictions that it removes in that it relates to accessing the long-range communication network. These restrictions are both technical and commercial: difficulty in installing and then configuring access to the network, difficulty in purchasing the network access right and in consuming it.

It is emphasized at this juncture that the exchanges between the two security elements are performed by way of a close connection, such as a wired interface or else a near-field wireless link. The security element of the device is configured in particular so as to be able to authenticate the security element of the electric power supply module without requiring exchanges with servers accessible by way of a wide area communication network. To this end, the security element of the device has the means necessary to verify the authenticity of the security element of the electric power supply module.

The various embodiments or embodiment features mentioned hereinafter may be added independently or in combination with one another to the management method such as defined above.

In one particular embodiment of the management method, the security element of the electric power supply module also authenticates the security element of the device. Each of the security elements thus has the means necessary to verify the authenticity of its peer security element.

In one particular embodiment of the management method, a previous association with another device is deleted following said start of delivery of electric power.

Deleting the previous associations between a security element of an electric power supply module and a security element of a communicating device makes it possible to guarantee that a user is not able to continue to benefit from the access right by supplying power to his communicating device in a standard manner. Once it has been inserted into a communicating device, the actions described above are implemented again by the electric power supply module.

In one particular embodiment, the management method comprises invalidation, by the security element of the power supply module, of the access right possessed by the security element of the device upon detection of remaining electric power that is below a threshold.

The electric power supply module is thus able to anticipate its complete discharging and ensure deletion of the access right in the communicating device.

In one particular embodiment of the management method, said configuration comprises at least sending information in relation to the validity of the access right to the security element of the device.

It is thus possible to grant the access right for a given time and, upon expiry of this right, to force communication between the two security elements.

In one particular embodiment of the management method, the configuration comprises sending information in relation to a communication network access profile to be downloaded by the security element of the device.

In this particular embodiment, the security element is an eUICC card. The security element of the device may then download the access profile that will then allow it to access a communication network without limitation.

In one particular embodiment of the management method, the configuration comprises activating the access right stored by the security element of the device.

In one particular embodiment of the management method, the configuration comprises the security element of the power supply module sending at least one security key to the security element of the device.

According to a second aspect, the invention relates to an electric power supply module intended to supply electric power to a communicating device. This module comprises:
  means for supplying electric power to a device to be supplied with power;
  a security element comprising:
    a detection module, designed to detect a start of delivery of electric power to said device;
    an authentication module, designed to authenticate itself to a security element of the device, at the end of which authentication said security elements are associated;
    a configuration module, designed to configure the security element of the device, the security element of the device, once configured, having a valid right of access to a service, allowing the device to access the service, and said access right remaining valid for as long as said device is supplied with power by said electric power supply module.

The advantages outlined for the method for managing a right of access to a service according to the first aspect are able to be transposed directly to the electric power supply module.

According to a third aspect, the invention relates to a communicating device intended to be supplied with electric power by an electric power supply module. This device comprises:
  a communication module, designed to communicate with devices of a communication network;
  a security element comprising:
    a boot module, designed to boot said security element following a start of delivery of electric power to said device;
    an authentication module, designed to authenticate a security element of the electric power supply module, at the end of which authentication said security elements are associated;
    a configuration module, designed to be configured by the security element of the electric power supply module, the security element of the device, once configured, having a valid right of access to a service, allowing the device to access the service, and said access right remaining valid for as long as said device is supplied with power by said electric power supply module.

The advantages outlined for the method for managing a right of access to a service according to the first aspect are able to be transposed directly to the communicating device.

According to a fourth aspect, the invention relates to a program for an electric power supply module, comprising program code instructions intended to command the execution of the actions of the method for managing a right of access to a service described above that are implemented by the electric power supply module when this program is executed by this module, and a recording medium able to be read by an electric power supply module and on which a program for an electric power supply module is recorded.

The advantages outlined for the method for managing a right of access to a service according to the first aspect are able to be transposed directly to the program for an electric power supply module and to the recording medium.

According to a fifth aspect, the invention relates to a program for a communicating device, comprising program code instructions intended to command the execution of the actions of the method for managing a right of access to a service described above that are implemented by the communicating device when this program is executed by this device, and a recording medium able to be read by a device and on which a program for a device is recorded.

The advantages outlined for the method for managing a right of access to a service according to the first aspect are able to be transposed directly to the program for a communicating device and to the recording medium.

BRIEF DESCRIPTION OF THE DRAWINGS

The technique for managing a right of access to a service for a communicating device will be better understood with the aid of the following description of particular embodiments, with reference to the appended drawings, in which.

DETAILED DESCRIPTION OF ILLUSTRATIVE EMBODIMENTS

Figure 1:
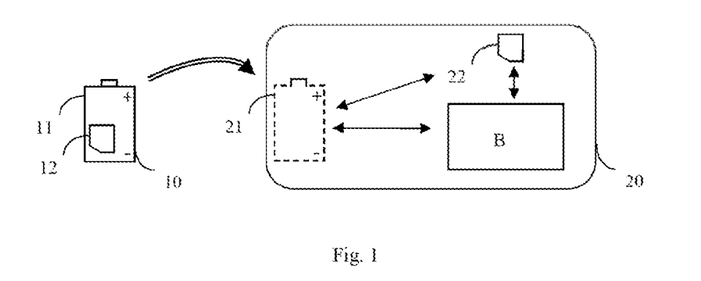
FIG. 1 shows a communicating device and an electric power supply module in one particular embodiment.

FIG. 1 shows a communicating device 20 and an electric power supply module 10 in one particular embodiment.

A communicating or connected device or object is an object designed to exchange information by way of a communication network, with, where applicable, another object, a communication terminal or else computer equipment of the communication network. A mobile terminal, a watch designed to transmit information to a mobile terminal via a wide area communication network such as the Internet, and a smoke detector designed to communicate with a remote mobile terminal in order to signal the presence of smoke in a house thus constitute examples of connected objects. In the example described here, the communicating device 20 is a medical monitoring module, designed to measure physical features of the user wearing it, for example his heart rate, and to transmit measurements to a remote computer device by way of a communication network (not shown in FIG. 1).

The communication network includes at least one network for accessing a wide area communication network, for example the Internet. The access network may be a mobile cellular network, for example of 2G, 3G, 4G, 5G type, or a low-consumption and long-range LPWA (for "low power wide area") network, such as the LoRa network.

The electric power supply module 10 in particular comprises means 11 designed to supply electric power to a device to be supplied with power, and a security element 12. The means 11 correspond for example to an electrical cell or a cell, designed to convert energy from a chemical reaction into electrical energy. Such a cell is single-use and cannot be recharged. In another exemplary embodiment, the means 11 correspond to a rechargeable battery. In this example, the battery is recharged with a charger, which also manages reloading of the right of access to the service in the battery.

When the electric power supply module 10 is inserted into or connected to a device to be supplied with power, it discharges while supplying power to this device.

The format of the electric power supply module may be based on an existing cell or battery standard, such as LR6, LR3, LR14, 6LR61, CR2032, CR2016, CR2012, CR1220, etc. In another particular embodiment, the format of the electric power supply module may be based on a battery format specific to the communicating device, tailored to the use thereof, in particular to the format, power consumption and connectivity requirements thereof.

The security element 12 is an inviolable dedicated platform, comprising hardware and software, able to securely host an application and its security data. In some particular embodiments, the security element 12 is a system on chip (SoC), a secure hardware element (SE, for "secure element"), or an integrated circuit (IC). In another particular embodiment, the security element furthermore provides a secure application execution environment ("trusted execution environment"). As an alternative, other security elements or mechanisms may be provided, making it possible to guarantee the security of the management method according to the access right in question.

Figure 3A:
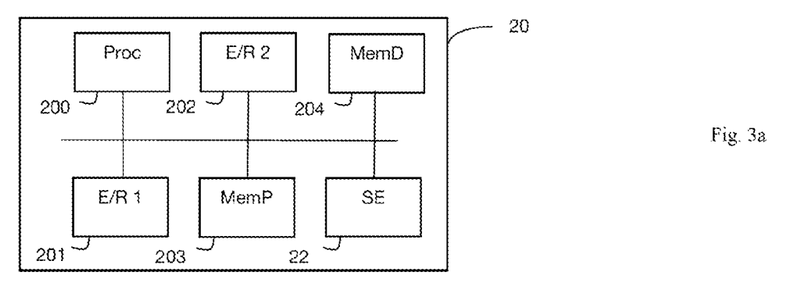
FIG. 3a shows a communicating device according to one particular embodiment.
Figure 3B:
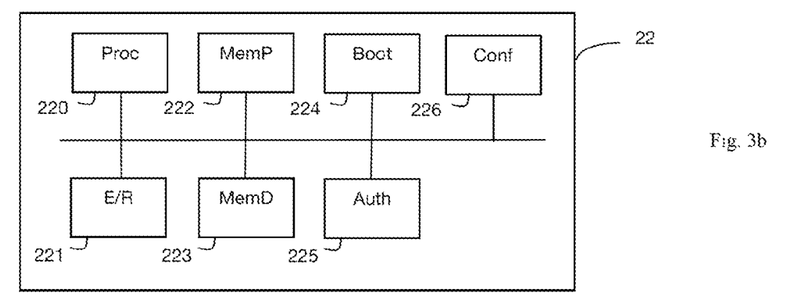
FIG. 3b shows a security element of a communicating device according to one particular embodiment.
Figure 3C:
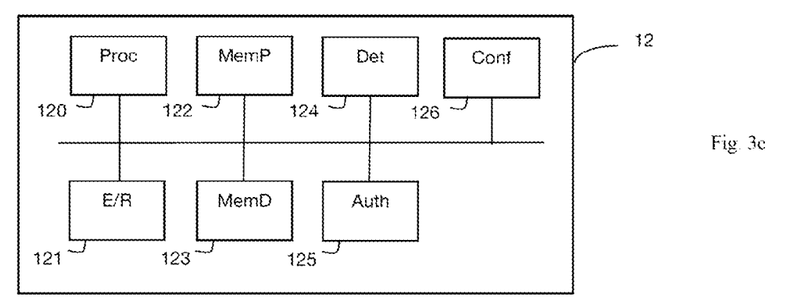
FIG. 3c shows a security element of an electric power supply module according to one particular embodiment.

FIG. 3c schematically illustrates the security element 12 in one particular embodiment. The security element 12 comprises in particular:

a processor 120 for executing code instructions of software modules;

a communication module 121, forming a communication interface with another security element;

a memory area 122, designed to store a program that comprises code instructions for implementing the steps of the management method;

a storage memory 123, designed to store data used in the implementation of the management method;

a detection module 124, designed to detect a start of delivery of electric power to said device;

an authentication module 125, designed to authenticate itself to a security element of a device supplied with power, the two security elements being associated once the security element 12 has been authenticated;

a configuration module 126, designed to configure the security element of the device, the security element of the device, once configured, having a valid right of access to a service, allowing the device to access this service, and this access right remaining valid for as long as the device is supplied with power.

In one particular embodiment, the authentication module 125 is also designed to authenticate the security element 22 of the device.

The communicating device 20, as shown in FIG. 1, comprises in particular a receptacle 21, intended to receive an electric power supply module 10, a security element 22, a block, denoted B, grouping together all of the processing modules of the communicating device. The receptacle 21 is for example molded and able to be accessed by removing a casing of the communicating device 20. The hardware architecture of the communicating device 20 is described in more detail later on with reference to FIG. 3a.

The security element 22 is an inviolable dedicated platform, comprising hardware and software, able to securely host applications and their confidential and cryptographic data, and providing a secure application execution environment, for example a UICC card. As an alternative, other security elements or mechanisms may be provided, making it possible to guarantee the security of the method for managing the access right.

FIG. 3b schematically illustrates the security element 22 in one particular embodiment.

The security element 22 comprises in particular:
- a processor 220 for executing code instructions of software modules;
- a communication module 221, forming a communication interface with another security element, by way of a communicating device;
- a memory area 222, designed to store a program that comprises code instructions for implementing the steps of the management method;
- a storage memory 223, designed to store data used in the implementation of the management method;
- a boot module 224, designed to boot said security element following a start of delivery of electric power to the device;
- an authentication module 225, designed to authenticate a security element of the electric power supply module, at the end of which authentication the security elements are associated;
- a configuration module 226, designed to be configured by the security element of the electric power supply module, the security element of the device, once configured, having a valid right of access to a service, allowing the device to access the service, and this access right remaining valid for as long as the device is supplied with power by the electric power supply module.

In one particular embodiment, the authentication module 225 is also designed to authenticate itself to the security element of the electric power supply module.

In one particular embodiment, the security element 22 is an eUICC card ("embedded universal integrated circuit card"), also called "eSIM" ("embedded subscriber identity module"), as is currently undergoing technical specification in the framework of the GSMA association.

It is emphasized at this juncture that the two security elements 12, 22 may take different forms.

"Right of access to a service" is the name given to one or more items of access data that, once they have been validated by the security element 12 to the security element 22, will allow the communicating device 20 to access a service. This item or these items of access data depend on the service that the communicating device has to access. The service may correspond to access to an item of data available in the communicating device, on a remote server or else on another communicating device, access to an application available in the communicating device, on a remote server or else on another communicating device, access to a functionality or access to a communication network. It is possible to combine several rights of access to a service.

When this involves a right of access to a communication network, also called network access right, this item or these items of access data depend on the access technology of the communication network that the communicating device 20 has to access.

When the communication network is a mobile network, the security element 22 may correspond to a conventional SIM card, which has been configured beforehand for a network operator. Validating the access right corresponds for example to sending a signal or a message to activate the security element 22, or else to activating a communication module of the communicating device 20.

Still for this same type of communication network, the security element 22 may correspond to a remotely programmable SIM card, that is to say one able to be configured remotely or "over the air". This technique is known under the term remote post-allocation of an access profile of a security element. In this case, the access right corresponds to an access profile to be downloaded by the security element 22. This access right is sent to the security element 22 by the security element 12. In this particular embodiment, the security element 22 comprises a limited access profile (called a boot profile or "bootstrap") to the network of an operator, allowing access to a network only in order to download a network access profile, identified by the access right provided by the security element 12. More precisely, an access profile has been generated by a subscription data management server, not shown in FIG. 1, linked to the operator. The access profile comprises an application for accessing the network and associated access data (reference is made to "credentials"), such as cryptographic keys and algorithms. Once it has been installed and authorized, the access profile allows access to an infrastructure of a given mobile network. It makes it possible in particular to authenticate the communicating device 20, more precisely the security element 22, when accessing the network of the operator.

When the communication network is a long-range and low-consumption network, for example LoRa, the access right corresponds to a security key. In a first particular embodiment, an item of access data corresponds to a communication key that allows the communicating device 20 to authenticate itself to equipment of the communication network. By way of illustrative example, when the communication network corresponds to a LoRa network, the item of access data is the LoRa network key. This network key allows the security element 22 to calculate one or more session keys, called "network session key". This embodiment is suitable when the communicating device 20, more precisely the security element 22, is certified beforehand by the operator of the communication network. In this embodiment, the security element 12 is able to authenticate the security element 22 or verify that the security element 22 is trusted. This makes it possible to guarantee that the network key is not provided to an unauthorized security element.

In a second particular embodiment, an item of access data corresponds directly to a network session key to be used. This embodiment is suitable when the communicating device 20, more precisely the security element 22, is not certified beforehand by the operator of the communication network. In this case, no long-term secret is transmitted by the security element 12 of the electric power supply module 10 to the security element 22 of the communicating device 20. The security element 12 of the electric power supply module 10 contains the network key and calculates the network session key to be used. The security element 22 of the communicating device 20 then regularly interrogates the security element 12 of the electric power supply module 10 so as to obtain a new network session key.

In another embodiment, the access right corresponds to an authorization to configure a network key through a radio interface ("over the air").

In another embodiment, the right of access to a service is validated by the security element 12 to the security element 22, and allows the communicating device 20 to access the service.

In one particular embodiment, the security element 12 stores a pair of keys: a private key that is specific thereto, used to sign data, and an associated public key. A public key certificate, for example an X509 certificate, has been issued in order to certify the public key by a certificate issuer. The security element 22 of the communicating device 20 stores the public key certificate of the certificate issuer. This allows the security element 22 to locally verify the certificate of the security element 12.

In another embodiment, each security element 12, 22 stores a pair of keys: a private key that is specific thereto, used to sign data, and an associated public key. A public key certificate, for example an X509 certificate, has been issued in order to certify the public key by a certificate issuer. The two public key certificates are signed by the same certificate issuer, so as to allow local mutual authentication.

The certificates that are presented may be individual certificates, or group certificates in order to preserve the anonymity of the security element or security elements.

In one particular embodiment, the authentication is explicit by implementing a zero knowledge disclosure protocol. Each security element provides proof of knowledge of a secret without having to disclose it.

FIG. 3a schematically illustrates a communicating device 20 in one particular embodiment.

The communicating device 20 comprises in particular:
- a processor 200 for executing code instructions of software modules;
- a communication module 201, forming a communication interface with a communication network, designed to communicate with devices of a communication network;
- a communication module 202, forming a communication interface with a security element;
- a memory area 203, designed to store a program that comprises code instructions for implementing the steps of the management method;
- a storage memory 204, designed to store data used in the implementation of the management method;
- a security element 22, as described above.

The access to a service for the communicating device depends in particular on a right of access to the service.

In the specific case in which the right of access to a service is a network access right, the communication module 201 is operational when a valid access right is configured.

It is emphasized at this juncture that the communicating device 20 also comprises other processing modules, not shown in FIG. 3a, that are designed to implement the various functions of a communicating device.

In one particular embodiment, the communication module 221 is designed in particular to communicate with the communication module 121 by way of a physical interface, which is for example wired. The communication module 121 is designed in particular to communicate with the communication module 221 by way of this physical interface.

In another particular embodiment, the communication module 221 is designed in particular to communicate with the communication module 121 by way of a near-field or short-range wireless communication protocol. The communication module 121 is designed in particular to communicate with the communication module 221 by way of this communication protocol.

In one particular embodiment, the exchanges between the two security elements 12, 22 are performed by way of a secure communication channel.

The method for managing a right of access to a service implemented by the security element 12 of the electric power supply module and the security element 22 will now be described with reference to FIGS. 2a and 2b.

Figure 2A:
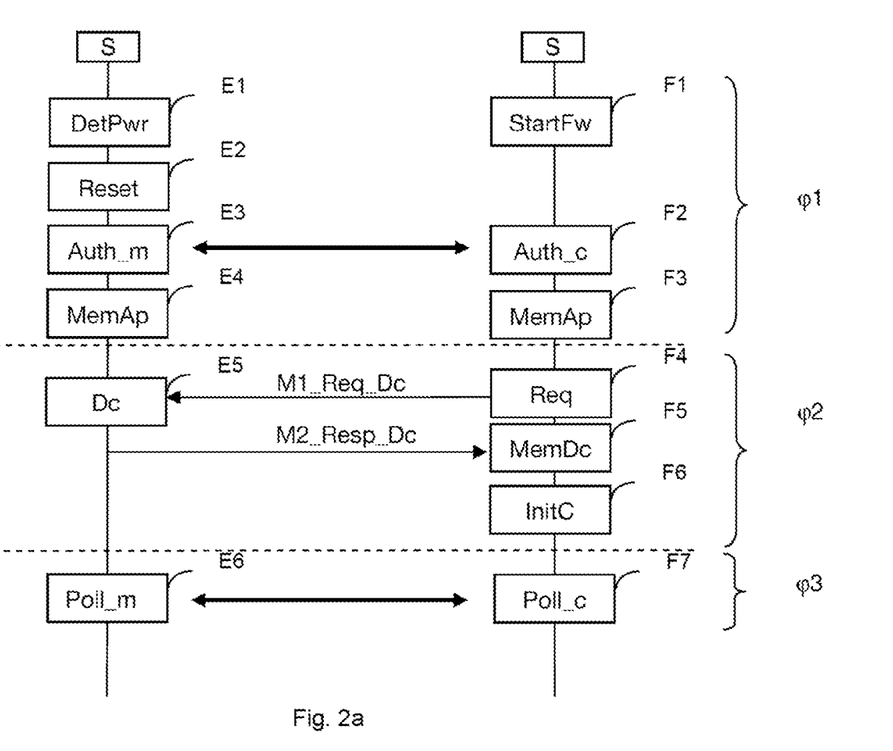
FIG. 2a illustrates steps of a method for managing a right of access to a service according to one particular embodiment.

FIG. 2a illustrates steps of the method for managing a right of access to a service for the communicating device 20, making it possible to configure the security element 22 with the right of access to a service.

The remainder of the description adopts, by way of illustration, the specific case of the network access right.

In the initial state, the communicating device 20 is not supplied with power. The electric power supply module 10 (more precisely the power supply means 11) does not deliver electric power. The communicating device 20 is not able to access the communication network.

The electric power supply module 10 is inserted into the communicating device 20 in the area 21 that is provided for this purpose. The communicating device 20 and the security element 22 are then supplied with electric power by the electric power supply module 10. The security element 12 is also supplied with electric power.

In a step F1, the security element 22 starts a boot program.

In a step E1, the security element 12 detects a start of delivery of electric power by the electric power supply module 10 to the communicating device 20 and to the security element 22. This detection (following the start of delivery of electric power) triggers a step E2, in which the security element 12 deletes a previous association with a communicating device. The security element 12 thus performs pairing again upon each insertion into a communicating device, for as long as the electric power supply module 10 still has electric power.

This detection of a start of delivery of electric power to the communicating device 20 also triggers authentication of the security element 12 of the power supply module 10 by the security element 22 of the communicating device 20, at the end of which authentication these security elements 12, 22 are associated.

More precisely, the security element 22 of the device contacts, in a step F2, the security element 12 of the electric power supply module 10 and authenticates it. This authentication is performed for example by way of a public key certificate stored in the security element 12 of the electric power supply module 10. It is recalled here that this certificate is signed by a certificate issuer. In one particular embodiment, the security element 22 of the communicating device 20 has a public key certificate of the certificate issuer, so as to implement the authentication locally. This authentication makes it possible to guarantee that the electric power supply module 10 is indeed authorized by the network operator to provide and to configure a network access right.

If this authentication fails, the electric power supply module 10 stops supplying electric power to the communicating device 20.

In another particular embodiment, in a step E3, the security element 12 of the power supply module 10 also authenticates the security element 22 of the communicating device 20. The authentication is then mutual. This authentication is performed for example by way of the public key certificates stored in the security elements 12, 22. This mutual authentication makes it possible to guarantee that the electric power supply module 10 is indeed authorized by the network operator to configure a network access right, and that the communicating device 20 is authorized by this same network operator to access the communication network. If this mutual authentication fails, the electric power supply module 10 stops supplying electric power to the communicating device 20.

When the security element 22 has authenticated the security element 12, or, in the other embodiment, when the two security elements 12, 22 have authenticated one another, they are then paired or associated. In a step E4, the security element 12 stores an identifier of the security element 22 of the communicating device 20 with which it has paired. In a step F3, the security element 22 stores an identifier of the security element 12 of the electric power supply module 10 with which it has paired. This ends the phase φ1 of pairing or association between the electric power supply module 10 and the communicating device 20.

Once this pairing (or association) has been performed, in a phase (p2, the security element 12 of the electric power supply module 10 configures the security element 22 of the communicating device 20 such that the latter has a valid network access right allowing it to access the communication network.

In a step F4, the security element 22 requests (message M1) a network access right from the security element 12. This request is received by the security element 12 in a step E5. Still in this step E5, the security element 12 returns (message M2) the network access right to the security element 22, which receives it in a step F5.

In a step F6, the security element 22 stores the received access right in the memory area 223. The access right remains valid for as long as the communicating device 20 is supplied with electric power by the electric power supply module. More precisely, the access right remains valid for as long as the two security elements 12, 22 are paired. When the electric power supply module 10 is removed, the communicating device 20 is no longer supplied with power and the network access right is deleted. The same applies when the electric power supply module 10 is discharged. The validity of the network access right is thus linked to an electric power supply of the communicating device 20. The access right thus gives access to the network for as long as the communicating device 20 is supplied with power by the electric power supply module. Specifically, a communicating device 20 accessing the network to a large extent will consume the electric power of the power supply module 10 more quickly, thereby limiting the duration of validity of its access right. It is thus advantageous to link electric power available in a power supply module 10 to a network access right.

In a first embodiment, the security element 12 activates an access right stored by the security element 22 of the device 20. More precisely, the security element 12 sends a signal or a message to activate the security element 22, or else a command to activate a communication module of the communicating device 20.

In a second embodiment, the security element 12 sends information in relation to a communication network access profile to be downloaded by the security element 22 of the device. More precisely, it commands downloading of an access profile by the security element 22. This access profile to be downloaded is identified by an activation code AC. As defined in paragraph 4.1 of the technical specification of the GSMA "SGP.22—RSP Technical Specification" v.1.1 dated Jun. 9, 2016 (available from GSMA's website on the address http://www.gsma.com/newsroom/all-documents/sgp-22-technical-specification-v1-1/), an activation code AC corresponds to a character string and comprises various information elements separated by a "$" character. The activation code AC comprises in particular an address of a server to be contacted in order to obtain the access profile, a token for accessing the profile and identifier of the server.

In a third embodiment, the security element 12 sends a security key, more precisely a network key, allowing the security element 22 to calculate one or more session keys.

In a fourth embodiment, the security element 12 sends at least one security key, more precisely a session key. The security element 22 then regularly interrogates the security element 12 so as to obtain a new session key.

In a fifth embodiment, the security element 12 sends an authorization to configure a network key through a radio interface.

In one particular embodiment, the security element 12 also sends information in relation to the validity of the access right to the security element 22 of the communicating device 20. This information corresponds for example to a duration of validity of the access right. The security element 22 thus again requests a network access right when the previous one is no longer valid. This makes it possible to secure access to the network. This information may also correspond to information on the maximum bit rate that the communicating device 20 has the right to access on the communication network.

In one particular embodiment, in a phase φ3, a regular mechanism for verifying the access right is implemented by the security element 22. In a step F7, said security element will thus periodically verify that the network access right is valid through a simple exchange with the security element 12 of the electric power supply module (step E6). This regular verification of the network access right may consist of an authentication of the security element 12 of the electric power supply module by the security element 22 of the communicating device.

In one particular embodiment, the security element 12 also transmits information in relation to the remaining access right percentage (corresponding to the percentage of electric power that has already been consumed). The user of the communicating device may be notified of this information by way of a human-machine interface.

Once the electric power of the power supply module 10 has been consumed, the communicating device 20 is no longer supplied with power and the network access right is no longer valid. When the communicating device 20 is supplied with power again, a new authentication is implemented, leading to new pairing and a new network access right.

The same applies if the power supply module 10 is removed.

If the power supply module 10 still contains electric power, it is able to be paired again when it is inserted into a communicating device.

Figure 2B:
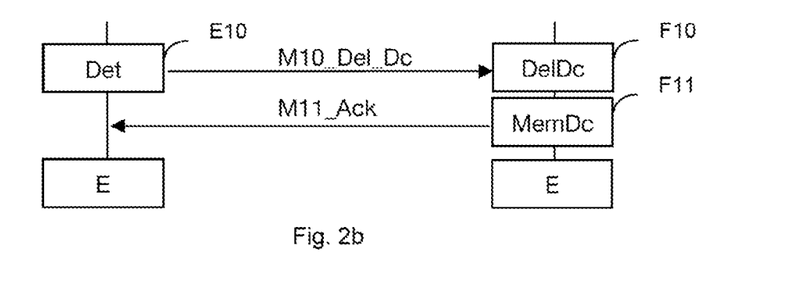
FIG. 2b illustrates steps of a method for managing a right of access to a service according to one particular embodiment.

FIG. 2b illustrates steps of the method for managing a network access right according to one particular embodiment. In a step E10, the security element 12 detects that the remaining electric power of the electric power supply module is below a threshold. In this case, still in this step E10, the security element 12 commands (message M10) invalidation of the network access right possessed by the security element 22 of the communicating device 20. In a step F10, the security element 22 receives this command and deletes the network access right that it had stored previously in a step F11. The security element 22 acknowledges the deletion of the network access right through a message M11. The user of the communicating device may be informed of this deletion by way of a human-machine interface.

In one particular embodiment, the security element 22 transmits, to a server of the operator, a notification indicating that the network access right has been used by the communicating device 20 and should be revoked.

The embodiments that have been described hinge on a single electric power supply module 10. Some communicating devices may need to combine a plurality of modules 10.

In terms of electricity, power is combined in a similar way as is performed for standard modules.

In one particular embodiment, the security element 22 pairs with each of the security elements 12 of the electric power supply modules. The security element 22 then has the network access right when it has received a secondary network access right from each of the security elements 12 (for each of the electric power supply modules). The communicating device 20 accesses the communication network only when the right number of modules 10 is inserted and when the corresponding number of security elements 12 is therefore paired.

In one particular embodiment, the network access right is determined by combining the secondary access rights obtained from each of the security elements 12. In the exemplary embodiment for the LoRa network, by way of illustration, a network key used by the communicating device 20 is calculated on the basis of the network keys received from the various security elements 12.

The regular mechanism for verifying the network access right is then implemented by the security element 22 for all of the paired security elements 12.

The embodiments have been described in a specific case in which the right of access to a service is a network access right, allowing the communicating device to access a communication network.

This description is easily able to be transposed to the more general case of a right of access to a service, such as:
- access to one or more items of data available in the communicating device, on a remote server or else on another communicating device;
- access to an application or a set of applications, available in the communicating device, on a remote server or else on another communicating device;
- access to a functionality;
- a combination of rights of access to various services.

It is understood that this technique for managing an access right makes it possible to simplify the experience for users of a communicating device. Specifically, it is enough for a user to purchase electric power supply modules identified as being compatible with their communicating device. No subscription to an operator needs to be made. The user simultaneously acquires electric power and the right of access to a service. No configuration of access data needs to be performed on the communicating device 20.

There is no limit attached to these various embodiments, and those skilled in the art are able to define further embodiments that make an access right conditional on a service on the basis of electric power available in an electric power supply module.

The technique for managing an access right is implemented by way of software components and/or hardware components. In this regard, the term "module" may correspond in this document equally to a software component, to a hardware component or to a set of hardware and/or software components, able to implement a function or a set of functions, according to what is described above in respect of the module in question.

A software component corresponds to one or more computer programs, one or more subroutines of a program, or more generally to any element of a program or of software. Such a software component is stored in memory and then loaded and executed by a data processor of a physical entity, and is able to access the hardware resources of this physical entity (memories, recording media, communication buses, electronic input/output cards, user interfaces, etc.).

In the same way, a hardware component corresponds to any element of a hardware assembly. It may be a programmable or non-programmable hardware component, with or without an integrated processor for executing software. It is for example an integrated circuit, a chip card, an electronic card for executing firmware, etc.

In one particular embodiment, the modules 124, 125, 126 are designed to implement the steps of the method for managing an access right described above that are implemented by the electric power supply module. These are preferably software modules comprising software instructions for executing the steps (or the actions) of the management method described above that are implemented by an electric power supply module. The invention therefore also relates to:
- a program for an electric power supply module, comprising program code instructions intended to command the execution of the steps (or the actions) of the management method described above when said program is executed by this electric power supply module;
- a recording medium able to be read by an electric power supply module and on which the program for an electric power supply module is recorded.

In one particular embodiment, the modules 224, 225, 226 are designed to implement the steps of the method for managing an access right described above that are implemented by the communicating device. These are preferably software modules comprising software instructions for executing the steps (or the actions) of the management method described above that are implemented by a communicating device. The invention therefore also relates to:
- a program for a communicating device, comprising program code instructions intended to command the execution of the steps (or the actions) of the management method described above when said program is executed by this communicating device;
- a recording medium able to be read by a communicating device and on which the program for a communicating device is recorded.

The software modules may be stored in or transmitted by a data medium. This may be a hardware storage medium, for example a CD-ROM, a magnetic floppy disk or a hard disk, or else a transmission medium such as an electrical, optical or radio signal, or a telecommunication network.

Although the present disclosure has been described with reference to one or more examples, workers skilled in the art will recognize that changes may be made in form and detail without departing from the scope of the disclosure and/or the appended claims.

The invention claimed is:

1. A management method for managing a right of access to a service for a communicating device, said method comprising:
   authenticating a security element of an electric power supply device by a security element of the communicating device, wherein at an end of authenticating, said security elements are associated, said authenticating being triggered by a detection of a start of delivery of electric power to said communicating device in order to supply electric power to said communicating device; and
   configuring the security element of the communicating device by the security element of the electric power supply device, the security element of the communicating device, once configured, having a valid right of access to a service, allowing the communicating device to access the service, and said access right remaining valid for as long as said communicating device is supplied with power by said electric power supply device.

2. The management method as claimed in claim 1, further comprising the security element of the electric power supply device deleting a previous association with another communicating device following said start of delivery of electric power.

3. The management method as claimed in claim 1, comprising invalidation, by the security element of the electric power supply device, of the access right possessed by the security element of the communicating device upon detection of remaining electric power that is below a threshold.

4. The management method as claimed in claim 1, wherein said configuring comprises at least sending information in relation to the validity of the access right to the security element of the communicating device.

5. The management method as claimed in claim 1, wherein the configuring comprises sending information in relation to a communication network access profile to be downloaded by the security element of the communicating device.

6. The management method as claimed in claim 1, wherein the configuring comprises activating the access right stored by the security element of the communicating device.

7. The management method as claimed in claim 1, wherein the configuring comprises the security element of the electric power supply device sending at least one security key to the security element of the device.

8. The management method as claimed in claim 1, wherein the security element is an inviolable dedicated platform, comprising hardware and software, able to securely host an application and security data of the application.

9. The management method as claimed in claim 8, wherein the security element is selected from the group consisting of a system on chip (SoC), a secure hardware element, an integrated circuit (IC), or a secure application trusted execution environment.

10. An electric power supply device to supply electric power to a communicating device, said device comprising:
    an electric supply of power for supplying electric power to the communicating device; and
    a security element comprising hardware and software, which is executable by the hardware to:
    detect a start of delivery of electric power to said device;
    authenticate the security element to a security element of the communicating device, wherein at an end of authentication said security elements are associated;
    configure the security element of the communicating device, the security element of the communicating device, once configured, having a valid right of access to a service, allowing the device to access the service, and said access right remaining valid for as long as said communicating device is supplied with power by said electric power supply device.

11. A communicating device to be supplied with electric power by an electric power supply device, said communicating device comprising:
    a communication interface, configured to communicate with devices of a communication network; and
    a security element comprising hardware and software, which is executable by the hardware to:
    boot said security element following a start of delivery of electric power to said communicating device;
    authenticate a security element of the electric power supply device, at the end of which authentication said security elements are associated; and
    be configured by the security element of the electric power supply device, the security element of the communicating device, once configured, having a valid right of access to a service, allowing the communicating device to access the service, and said access right remaining valid for as long as said communicating device is supplied with power by said electric power supply device.

12. A non-transitory computer-readable recording medium comprising a program stored thereon, which comprises program code instructions to command execution of a method for managing a right of access to a service for a communicating device, when the instructions are executed by a processor of an electric power supply device, wherein the instructions configure the electric power supply device to perform acts comprising:
    detecting a start of delivery of electric power from the electric power supply device to said communicating device, triggering an authenticating of a security element of the electric power supply device by a security element of the communicating device, wherein at an end of the authenticating, said security elements are associated; and
    configuring the security element of the communicating device by the security element of the power supply device, the security element of the communicating device, once configured, having a valid right of access to a service, allowing the communicating device to access the service, and said access right remaining valid for as long as said communicating device is supplied with power by said electric power supply device.

13. A non-transitory computer-readable recording medium comprising a program stored thereon, which comprises program code instructions to command execution of a method for managing a right of access to a service for a communicating device, when the instructions are executed by a processor of the communicating device, wherein the instructions configure the communicating device to perform acts comprising:
    authenticating a security element of an electric power supply device by a security element of the communicating device, wherein at an end of authenticating, said security elements are associated, said authenticating being triggered by a detection of a start of delivery of electric power to said communicating device in order to supply electric power to said communicating device; and configuring the security element of the communicating device by the security element of the power supply device, the security element of the communicating device, once configured, having a valid right of access to a service, allowing the communicating device to access the service, and said access right remaining valid for as long as said communicating device is supplied with power by said electric power supply device.

* * * * *